United States Patent [19]

Wechsler

[11] Patent Number: 4,995,334
[45] Date of Patent: Feb. 26, 1991

[54] AQUARIUM-TERRARIUM TANK

[76] Inventor: Lawrence I. Wechsler, 1 Wooleys La., Great Neck, N.Y. 11023

[21] Appl. No.: 520,845

[22] Filed: May 8, 1990

Related U.S. Application Data

[63] Continuation of Ser. No. 279,915, Dec. 5, 1988, abandoned.

[51] Int. Cl.$^5$ .............................................. A01K 63/00
[52] U.S. Cl. ............................................................ 119/5
[58] Field of Search ........................................ 119/3, 5

[56] References Cited

U.S. PATENT DOCUMENTS

| | | | |
|---|---|---|---|
| 2,594,474 | 4/1952 | McGrath | 119/3 |
| 3,044,209 | 7/1962 | Roach | 119/5 |
| 3,288,110 | 11/1966 | Goldman et al. | 119/5 |
| 4,029,050 | 6/1977 | Genest | 119/5 |
| 4,117,805 | 10/1978 | Ward | 119/5 |
| 4,188,909 | 2/1980 | Spivak | 119/5 |
| 4,606,821 | 8/1986 | D'Imperio | 119/5 X |
| 4,754,571 | 7/1988 | Riechmann | 119/5 X |

FOREIGN PATENT DOCUMENTS 982613 12/1982 U.S.S.R. ................................. 119/3

Primary Examiner—John G. Weiss
Assistant Examiner—R. Thomas Price

[57] ABSTRACT

An aquarium-terrarium tank designed to provide a semi-aquatic animal with a natural environment. A shortened side panel enables an over the side filter to operate effectively while permitting a reduced water level to be maintained within the tank. A dry, land area may then be provided for the animal within the tank without the danger of escape. In one embodiment, the opening above the lowered side wall is restricted by the permanent addition of at least one panel affixed between the top edge of the lowered side wall and the edge of the adjacent full size wall such that it is in the same plane as the lowered side wall. In a further embodiment, the closure consists of a removable panel containing a cutout of appropriate size to accommodate the size of the filter selected.

4 Claims, 2 Drawing Sheets

AQUARIUM-TERRARIUM TANK

BACKGROUND OF THE INVENTION

This invention is a continuation of Ser. No. 07/279,915 filed on 12/5/88 now abandoned which relates to home aquariums, and more particularly to those used to house turtles amphibians and other semi-aquatic animals.

Turtles and amphibians have been generally kept in relatively shallow aquariums, where periodic water changes were required in order to provide a clean environment. These shallow conditions did not provide the animal with sufficient exercise, nor did it allow for effective water filtration between successive water changes.

Attempts have been made to provide an aquarium in which there is a sufficient depth of water combined with a dry, land area. In U.S. Pat. No. 3,786,781, an enclosure intended for placement upon a conventional aquarium is disclosed to have a ramp which would allow the amphibian or turtle access to the dry portion of the assembly. Such a set up is cumbersome, and does not adequately suggest a means by which the water within the tank may be effectively filtered. U.S. Pat. Nos. 3,804,064 and 4,176,620 both provide for a dry area within a conventional aquarium where the water in the tank may be kept at a sufficient level to allow the amphibian or turtle adequate room to swim. Both designs, however, do not solve the problem of filtering the relatively large volume of water contained within the aquarium.

To solve the problem of keeping the water free of contaminants, some have suggested the use of submersible pump filters which are presently available for home aquariums. Such filters have the disadvantage of being relatively expensive and the filtering material which may be used within them is generally limited to foam. Submersible filters are also difficult to conceal and detract from the aesthetic appearance of the aquarium. In addition, the fact that these filters must be fully submerged in the water, makes them difficult to maintain, since they must be removed from the tank in order to change the filtering medium.

Closed system, canister type filters are satisfactory alternatives in a large tank set-up, but because of size and expense are impractical for smaller aquariums.

Another alternative for the hobbyist is the use of over the side syphon filters which are widely used for filtration of small to moderately sized aquarium set-ups. They are inexpensive, effective and easy to maintain. They also provide a wide choice of filtering media which may be used depending on particular needs, and since they are external to the tank, do not detract from the appearance of the aquarium. The limitation of these filters is that the amount of suction provided is generally low, and as a result the water level must be maintained within a few inches of the top of the aquarium. This does not pose a particular problem in an aquarium containing fish since the water is generally kept at a level very near the top of the tank. However, in an aquarium devoted to turtles and amphibians, where a land area is provided, these filters are ineffective since the water level must be significantly reduced to prevent escape of the animals.

Accordingly, it is a principal object of the present invention to provide an aquarium which would allow turtles and amphibians to live in both a water and land environment, while at the same time providing a manageable means for effective filtration of the water within the tank.

Another object of the present invention is to provide the aquarium with a dry, land area which is warm, and free of drafts, where the animal may dry out and bask, and at the same time prevent the animal from escaping the confines of the tank.

A further object is to provide enough water depth to allow the turtle or amphibian sufficient room to swim and exercise normally.

Other objects of the present invention are to provide an aquarium for semi-aquatic animals which is simple in design, inexpensive to manufacture and easy to maintain.

SUMMARY OF THE INVENTION

The present invention comprises an aquarium with a bottom wall and vertically extending side walls, assembled and sealed in such a way as to be capable of containing a volume of water. One of the vertical walls is shorter in height than the rest, for the purpose of allowing an over the side, syphon type filter to rest on its top edge. When the tank is filled with water, the level is maintained just below the height of the shortened side wall allowing the filter to perform satisfactorily. A land area may be provided in a variety of ways on the side of the tank opposite the filter, where the vertical walls with greater height prevent the escape of the animal, while still providing clear viewing.

In a preferred embodiment, the tank is provided with a protective molding surrounding the top and bottom perimeter of the tank. This increases the stability of the tank and allows a light fixture to rest securely on the top edge. In addition, a means of closing the opening formed by the top molding and the top edge of the lowered side wall is provided. In one form, panels of suitable material and size are cemented into place between the top edge of the shortened wall and the adjoining walls of the aquarium. A filter may then be mounted between the panels. In another form, a single panel containing a cut-out of suitable size to accommodate the proportions of the filter is used to close the opening above the lowered wall. In this embodiment, the panel is attached to the tank using a channel at the bottom edge and an interlocking arrangement on the sides and top. The panel cut-out may be altered at any time to accommodate a change in the size of the filter used.

DETAILED DESCRIPTION OF THE PREFERRED EMBODIMENT

Figure 2:
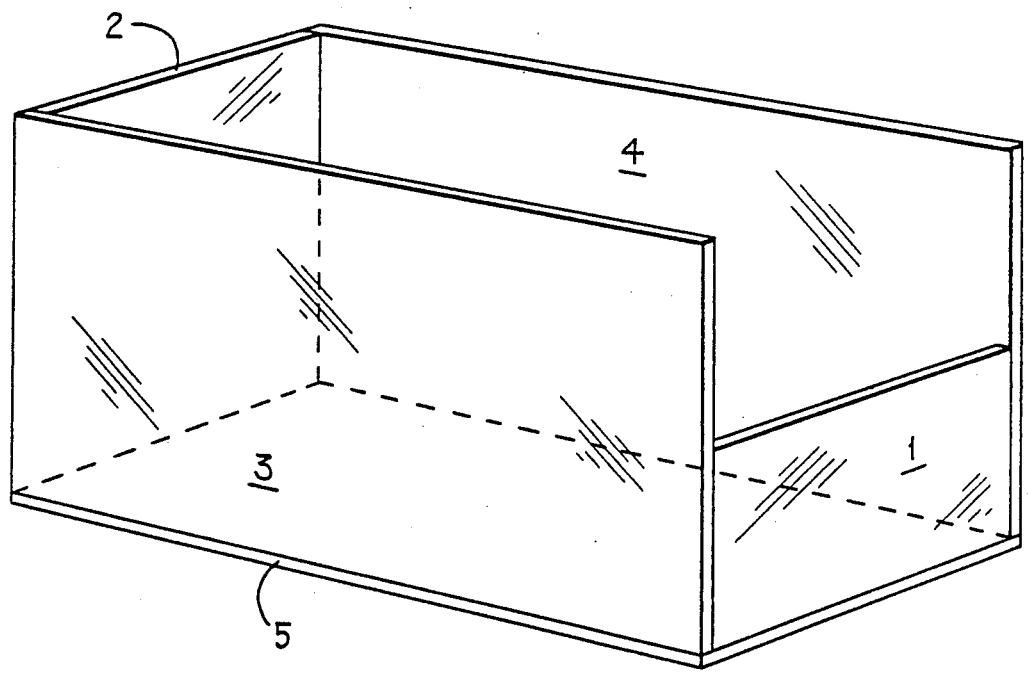
FIG. 2 is a perspective view of the basic tank structure of the present invention.
Figure 1:
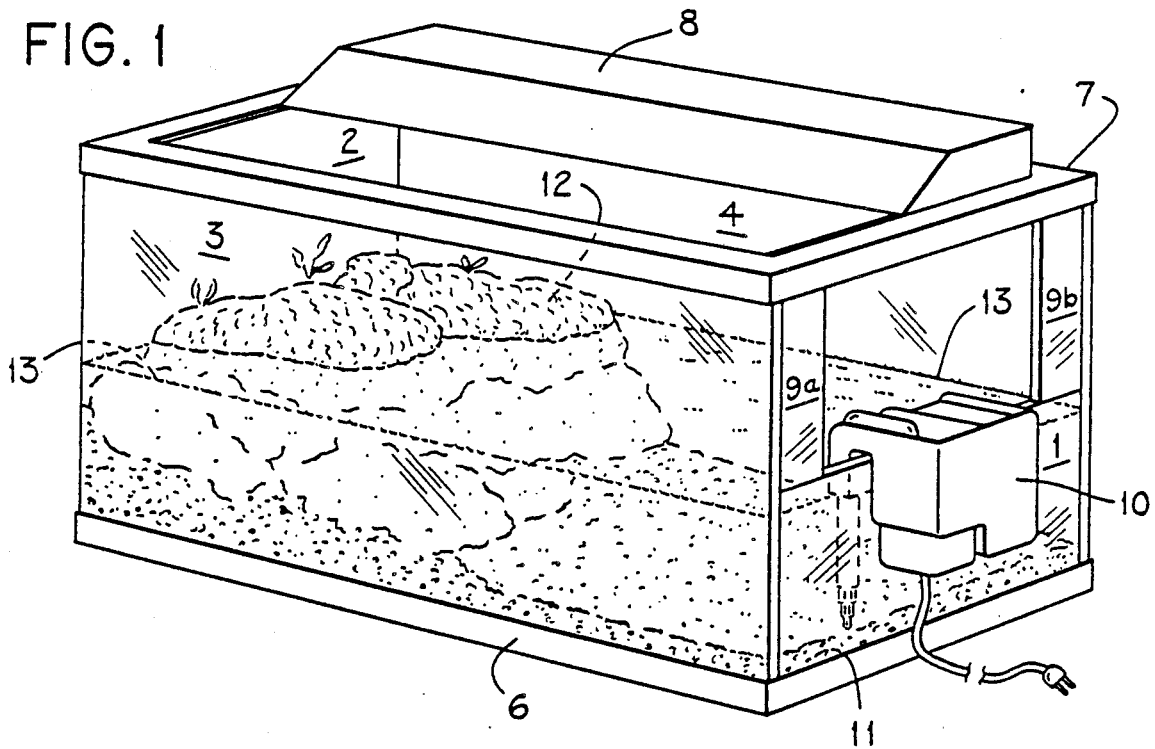
FIG. 1 is a perspective view of one embodiment of the present invention in operation.

Referring now to the FIGS. 1 and 2, the tank shown includes a bottom wall 5 joined at its peripheral edges to end wall 2, shortened end wall 1 and the front and back walls 3 and 4. The walls 1–5 may be made from any suitable material which includes, but is not limited to glass and certain transparent acrylic plastics. The preferred method of construction involves gluing the walls together to form a water-tight seal. Commonly used silicone based cement which is non-toxic to both plants and animals is ideal for this purpose. It should be noted that although FIG. 2 illustrates placing the side walls 1–4 atop the bottom wall 5, the exact placement of the walls 1–5 with respect to one another is not a critical feature. Referring to FIG. 1, the tank is provided with a bottom molding 6 which surrounds the entire perimeter, and increases the stability of the tank when placed on a surface. A top molding 7 also surrounds the tank and supports a light fixture 8 which rests securely on the inside edge of the top molding 7. In the embodiment shown in FIG. 1, two transparent add-on panels 9a and 9b are cemented into place between the shortened end wall 1 and front and back wall 3 and 4 and are also joined to the inside of the top molding 7 in order to insure that the animal within the tank will not escape. The add-on panels 9a and 9b are of such dimensions to allow the over the side filter 10 to be placed over the top edge of the shortened end wall 1 between the add-on panels 9a and 9b. The aquarium is filled with a layer of gravel 11, and rocks 12 are built up at the end of the tank, opposite the filter 10 and lowered end wall 1, in order to form a dry land area. The water level 13 is maintained at just below the top edge of the shortened end wall 1 to insure proper functioning of the filter 10.

The amount by which the shortened end wall 1 is shorter than the other vertical walls 2–4 is not critical, but in general the shortened end wall 1 is approximately ½ of the height of the other vertical walls 2–4 such that a balance is struck between depth of water in the tank and the height of the tank above the dry land area.

A rectangularly shaped tank is probably the most practical shape for a tank of this nature and for this reason has been selected for the purpose of disclosure. However, it will be understood that a tank of any shape and size may employ the principals set forth by the present invention. Moreover, if desired, the rear wall 4 may be shortened instead of using a shortened end wall 1, allowing the filter 10 to hang from the rear of the tank and requiring placement of the dry land area in the front or middle of the tank.

Figure 3:
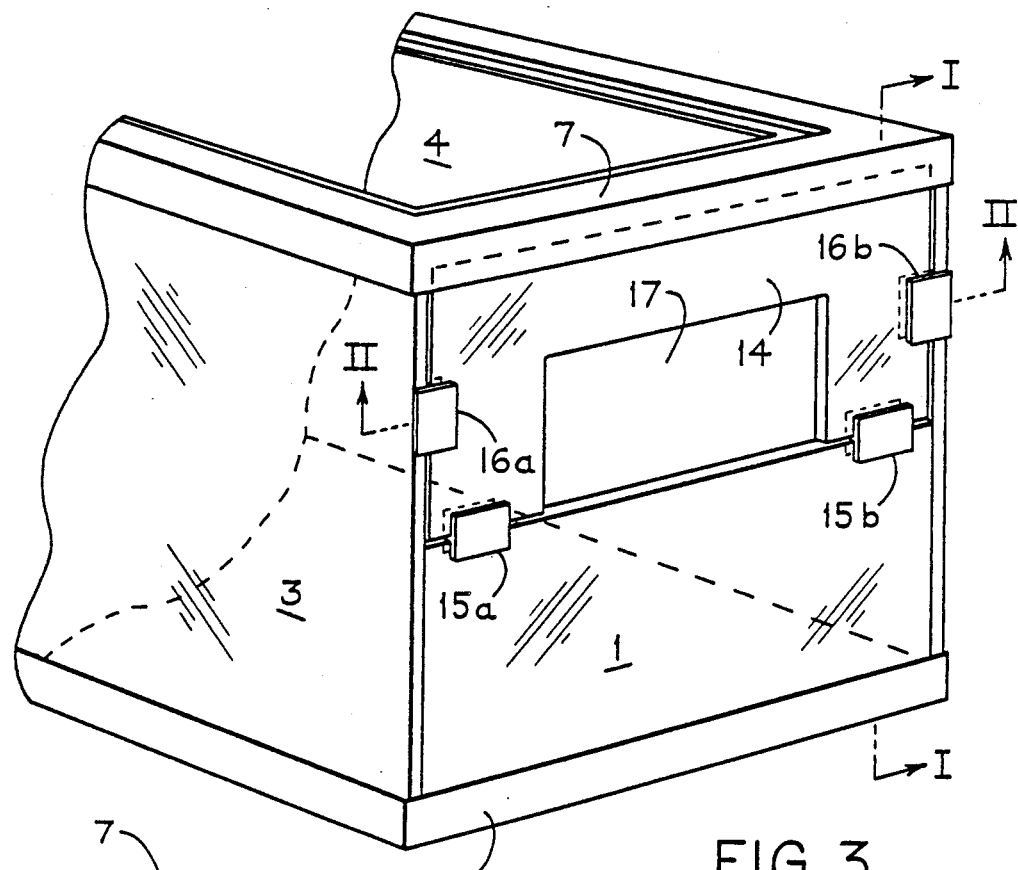
FIG. 3 is an enlarged perspective view of a second embodiment of the present invention and illustrating a removable end panel.
Figure 4:
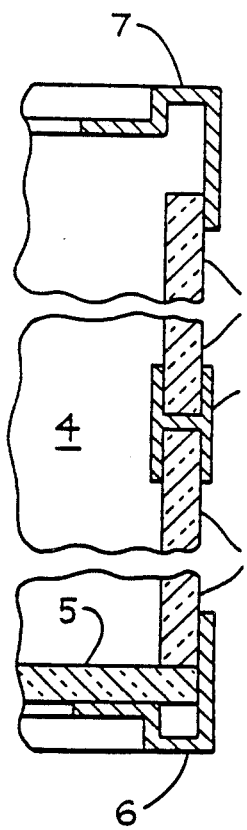
FIG. 4 is a sectional view taken on line I—I of FIG. 3 and illustrating removable end panel assembly.
Figure 5:
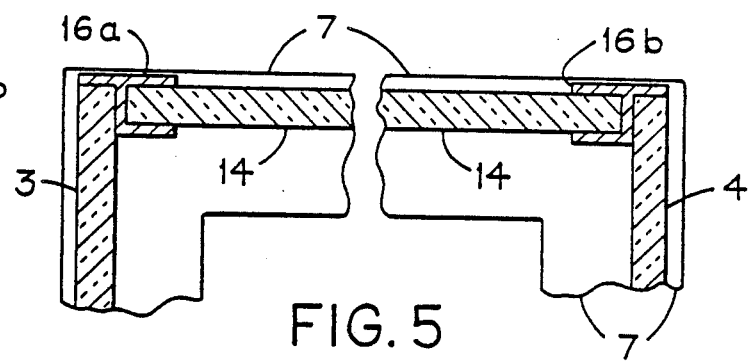
FIG. 5 is a sectional view taken on line II—II of FIG. 3 and illustrating removable end panel assembly.

FIGS. 3–5 illustrates a second embodiment of the present invention which differs from that already described in FIG. 1 by the method with which the opening above the shortened side wall 1 is closed. Instead of a permanent, non-adjustable closing, a panel 14 containing an opening 17 is connected to the shortened side wall 1 by means of press-fit connectors 15a and 15b. The press-fit connectors 15a and 15b are made from short lengths of plastic extrusion. The top edge of the panel 14 is placed up and inside the top molding 7, thus preventing the animal within the tank from pushing the panel outward. To keep the panel 14 from being pushed into the tank, press-fit side clips 16a and 16b are attached to the panel 14 such that when the panel is in place, the flanges on the press-fit side clips 16a and 16b restrict inward movement of the panel 14 by hitting against the edges of the front wall 3 and back wall 4. By employing this interlocking design, the panel 14 is held stationary, but may still be easily removed and replaced with one containing a different size opening 17, for example where the filter 10 is replaced with one of larger filtering capacity.

I claim:

1. An aquarium tank having a bottom wall peripherally bounded by vertical side walls, each vertical side wall having a top edge, at least one of the vertical peripheral side walls being at least partially shorter in height than the other side walls, for holding water at a level below the top edge of said at least partially shorter peripheral side wall, and a hanging filter mounted on the top edge of said at least partially shorter peripheral side wall having a water intake extending downwardly therefrom to withdraw water from the interior of the tank.

2. The aquarium as in claim 1, wherein said aquarium is bounded on the bottom and uppermost perimeter by molding, said molding forming a continuous band around said aquarium, and forming an opening bounded by the top edge of the at least partially shorter peripheral side wall, the two adjacent full height peripheral side walls and the uppermost perimeter molding.

3. The combination of claim 2, further comprising at least one panel permanently affixed to said aquarium above and in the same vertical plane as the at least partially shorter peripheral side wall and affixed on one side to an adjoining full height peripheral side wall such that the top edge of said panel is in line with the top edge of said adjoining full height peripheral side wall.

4. The combination of claim 2, including a means for closing the opening bounded by the top edge of the at least partially shorter peripheral side wall, the two adjacent full height peripheral side walls and the uppermost perimeter molding, comprising;

a panel adapted to be aligned with the at least partially shorter peripheral side wall to fit said opening and to extend up and inside the uppermost perimeter molding, said panel having a top and a bottom edge and two vertical side edges, and having a cut-out at the bottom edge of said panel to receive the hanging filter mounted on the at least partially shorter peripheral side wall;

at least one portion on the panel adapted to engage the top edge of said at least partially shorter peripheral side wall such that both are held in the same vertical plane; and at least one portion of each of the vertical side edges of said panel arranged to contact the adjacent full height peripheral side walls serving to hold said panel rigidly in the same vertical plane as the at least partially shorter peripheral side wall.

* * * * *